US012003049B2

(12) United States Patent
Morita et al.

(10) Patent No.: US 12,003,049 B2
(45) Date of Patent: Jun. 4, 2024

(54) CONNECTOR AND ELECTRONIC DEVICE

(71) Applicant: KYOCERA CORPORATION, Kyoto (JP)

(72) Inventors: Shunsuke Morita, Yokohama (JP); Masayoshi Kakino, Yokohama (JP); Masashi Kakeno, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 239 days.

(21) Appl. No.: 17/618,822

(22) PCT Filed: Jul. 16, 2020

(86) PCT No.: PCT/JP2020/027734
§ 371 (c)(1),
(2) Date: Dec. 13, 2021

(87) PCT Pub. No.: WO2021/020152
PCT Pub. Date: Feb. 4, 2021

(65) Prior Publication Data

US 2022/0239026 A1 Jul. 28, 2022

(30) Foreign Application Priority Data

Jul. 26, 2019 (JP) ................................ 2019-138318

(51) Int. Cl.
*H01R 12/91* (2011.01)
*H01R 12/71* (2011.01)
(Continued)

(52) U.S. Cl.
CPC ........... *H01R 12/91* (2013.01); *H01R 12/716* (2013.01); *H01R 13/629* (2013.01);
(Continued)

(58) Field of Classification Search
CPC .... H01R 12/91; H01R 12/716; H01R 13/629; H01R 13/6476; H01R 2201/18;
(Continued)

(56) References Cited

U.S. PATENT DOCUMENTS 10,199,761 B1 * 2/2019 Kuo .................... H01R 12/716
10,320,124 B1 6/2019 Yang
(Continued)

FOREIGN PATENT DOCUMENTS

CN 109964372 A 7/2019
EP 2922150 A2 9/2015
(Continued)

*Primary Examiner* — Abdullah A Riyami
*Assistant Examiner* — Nelson R. Burgos-Guntin
(74) *Attorney, Agent, or Firm* — Duane Morris LLP

(57) ABSTRACT

A fixed insulator includes a plurality of first fixing grooves disposed along an arrangement direction in which a plurality of contacts are arranged, and partition walls each disposed between two adjacent contacts. A movable insulator includes a plurality of second fixing grooves disposed along the arrangement direction. The contacts each include a first base portion supported by a corresponding one of the first fixing grooves, a second base portion supported by a corresponding one of the second fixing grooves, a first arm portion connected to the first base portion and disposed between two corresponding adjacent ones of the partition walls, and a second arm portion connected to the first arm portion and the second base portion. A largest width of the first arm portion is smaller than a largest width of the second arm portion.

12 Claims, 21 Drawing Sheets

(51) Int. Cl.
*H01R 13/629* (2006.01)
*H01R 13/6476* (2011.01)

(52) U.S. Cl.
CPC ..... *H01R 13/6476* (2013.01); *H01R 2201/18* (2013.01); *H01R 2201/26* (2013.01)

(58) Field of Classification Search
CPC .... H01R 2201/26; H01R 13/20; H01R 12/73; H01R 13/6474; H01R 12/707; H01R 12/71; H01R 12/771; H01R 13/02; H01R 13/6473; H01R 24/00; H01R 12/78; H01R 12/79
See application file for complete search history.

(56) References Cited

U.S. PATENT DOCUMENTS

| | | | | |
|---|---|---|---|---|
| 11,349,240 | B2* | 5/2022 | Yoshida | H01R 12/91 |
| 2012/0003875 | A1* | 1/2012 | Akai | H01R 13/6315 439/660 |
| 2014/0213115 | A1* | 7/2014 | Kimura | H01R 24/60 439/629 |
| 2015/0044917 | A1* | 2/2015 | Takaki | H01R 13/193 439/733.1 |
| 2015/0270658 | A1* | 9/2015 | Aoki | H01R 24/60 439/660 |
| 2016/0294111 | A1* | 10/2016 | Kobayashi | H01R 13/187 |
| 2019/0013608 | A1* | 1/2019 | Yoshida | H01R 13/631 |
| 2019/0214762 | A1 | 7/2019 | Morita | |
| 2019/0348782 | A1* | 11/2019 | Horii | H01R 13/41 |
| 2020/0052424 | A1* | 2/2020 | Aoki | H01R 13/642 |
| 2020/0083642 | A1* | 3/2020 | Chen | H01R 12/7005 |
| 2020/0083643 | A1* | 3/2020 | Hashiguchi | H01R 13/6315 |
| 2020/0176930 | A1* | 6/2020 | Shioda | H01R 13/502 |
| 2020/0295511 | A1* | 9/2020 | Shioda | H01R 13/6315 |
| 2021/0091498 | A1* | 3/2021 | Obata | H01R 13/113 |
| 2021/0111504 | A1* | 4/2021 | Kobayashi | H01R 13/2407 |
| 2021/0280999 | A1* | 9/2021 | Horii | H01R 12/91 |
| 2021/0328374 | A1 | 10/2021 | Morita | |
| 2021/0376509 | A1* | 12/2021 | Obata | H01R 12/71 |
| 2021/0376510 | A1* | 12/2021 | Obata | H01R 13/24 |
| 2021/0384663 | A1* | 12/2021 | Miyamoto | H01R 12/91 |
| 2021/0384680 | A1* | 12/2021 | Yamazaki | H01R 12/716 |
| 2022/0021143 | A1* | 1/2022 | Obata | H01R 13/2442 |
| 2022/0190504 | A1* | 6/2022 | Sakai | H01R 13/2407 |
| 2022/0216633 | A1 | 7/2022 | Morita | |
| 2022/0239026 | A1* | 7/2022 | Morita | H01R 13/6476 |
| 2022/0271470 | A1* | 8/2022 | Shioda | H01R 43/18 |
| 2023/0011865 | A1* | 1/2023 | Kitazawa | H01R 12/91 |
| 2023/0178932 | A1* | 6/2023 | Chen | H01R 13/6315 439/248 |
| 2023/0246366 | A1* | 8/2023 | Aihara | H01R 12/91 439/76.1 |
| 2023/0307872 | A1* | 9/2023 | Aoki | H01R 13/6315 |
| 2023/0327375 | A1* | 10/2023 | Chen | H01R 13/6315 439/247 |
| 2023/0344177 | A1* | 10/2023 | Noguchi | H01R 12/73 |
| 2023/0396008 | A1* | 12/2023 | Huang | H01R 12/73 |

FOREIGN PATENT DOCUMENTS

| | | | |
|---|---|---|---|
| JP | 2008-084756 | A | 4/2008 |
| JP | 2012-129109 | A | 7/2012 |
| JP | 2015176861 | A | 10/2015 |
| JP | 2012129109 | A | 7/2017 |
| JP | 2018160472 | A | 10/2018 |
| WO | 2019/082607 | A | 5/2019 |

* cited by examiner

CONNECTOR AND ELECTRONIC DEVICE

TECHNICAL FIELD

The present invention relates to a connector and an electronic device.

BACKGROUND ART

Connectors for connecting two substrates to each other have been known. A connector attached to one substrate mates with a connector attached to the other substrate. However, the relative positions of the two connectors may differ from the relative positions designed. In such a case, the two connectors may fail to mate properly. In view of this, a floating connector is known that can properly mate with another connector even when these two connectors are misaligned. An example of the floating connector is described in Patent Document 1. The connector disclosed in Patent Document 1 has a contact provided with a slit for improving flexibility and adjusting characteristic impedance.

CITATION LIST

Patent Literature

Patent Document 1: JP 2012-129109 A

SUMMARY OF INVENTION

A connector of one aspect includes a fixed insulator, a movable insulator that is disposed on an inner side of the fixed insulator and is movable relative to the fixed insulator, and a plurality of contacts attached to the fixed insulator and the movable insulator. The fixed insulator includes a plurality of first fixing grooves disposed along an arrangement direction in which the plurality of contacts are arranged, and partition walls each disposed between two corresponding adjacent ones of the contacts. The movable insulator includes a plurality of second fixing grooves disposed along the arrangement direction. The contacts each include a first base portion supported by a corresponding one of the first fixing grooves, a second base portion supported by a corresponding one of the second fixing grooves, a first arm portion connected to the first base portion and disposed between two corresponding adjacent ones of the partition walls, and a second arm portion connected to the first arm portion and the second base portion. A largest width of the first arm portion is smaller than a largest width of the second arm portion.

DESCRIPTION OF EMBODIMENTS

Below, an embodiment of a connector according to the present disclosure will be described with reference to the drawings. Note that the embodiment described below is not intended to limit the present invention. Furthermore, constituent elements in the embodiment described below include those that can be easily replaced by a person skilled in the art and include those that are substantially identical.

Embodiment

Figure 1:
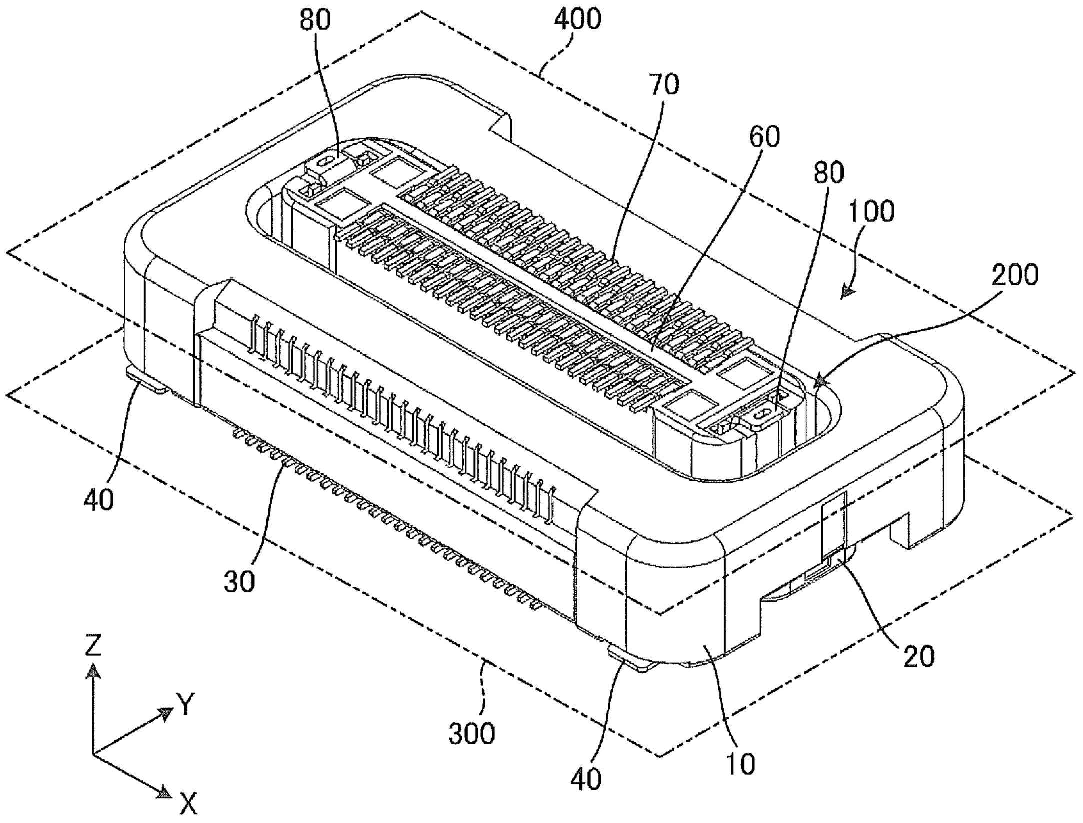
FIG. 1 is a perspective view of a connector and another connector of an embodiment after mating.
Figure 2:
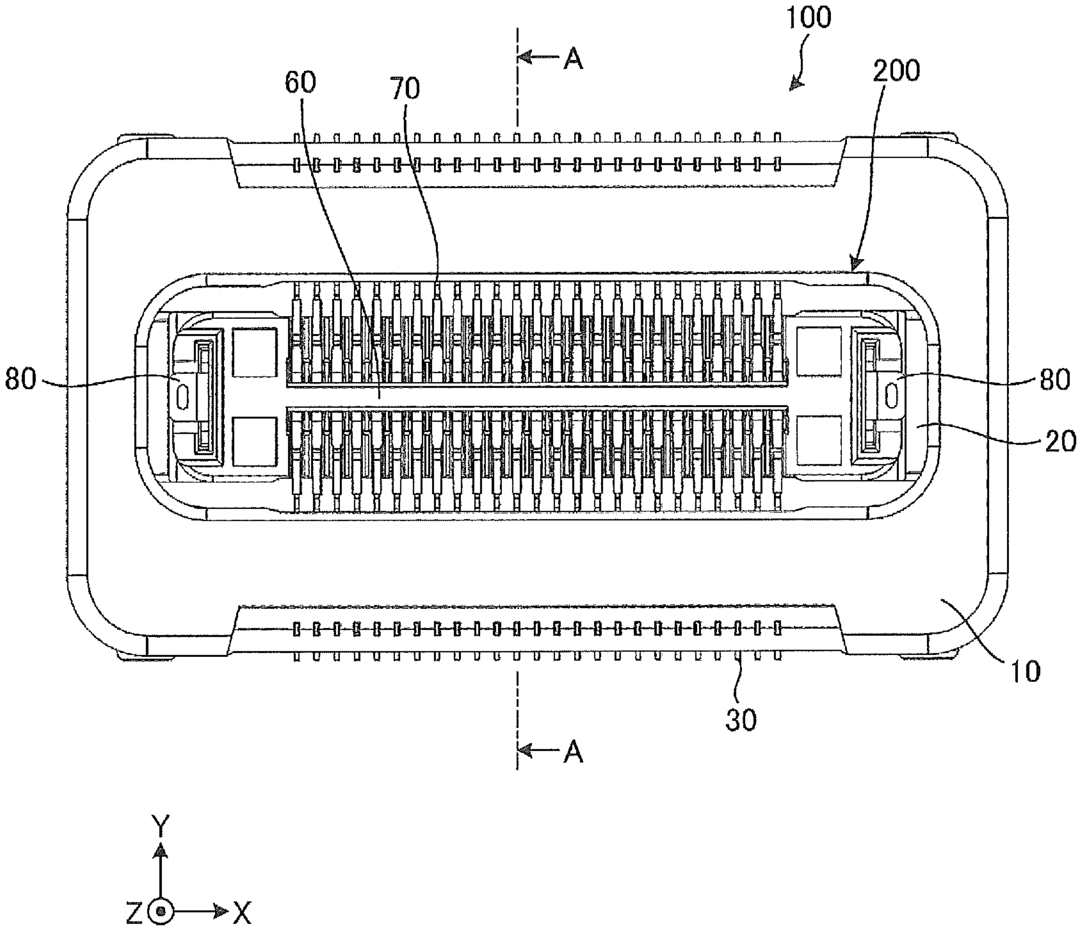
FIG. 2 is a plan view of the connector and the other connector of the embodiment after the mating.
Figure 3:
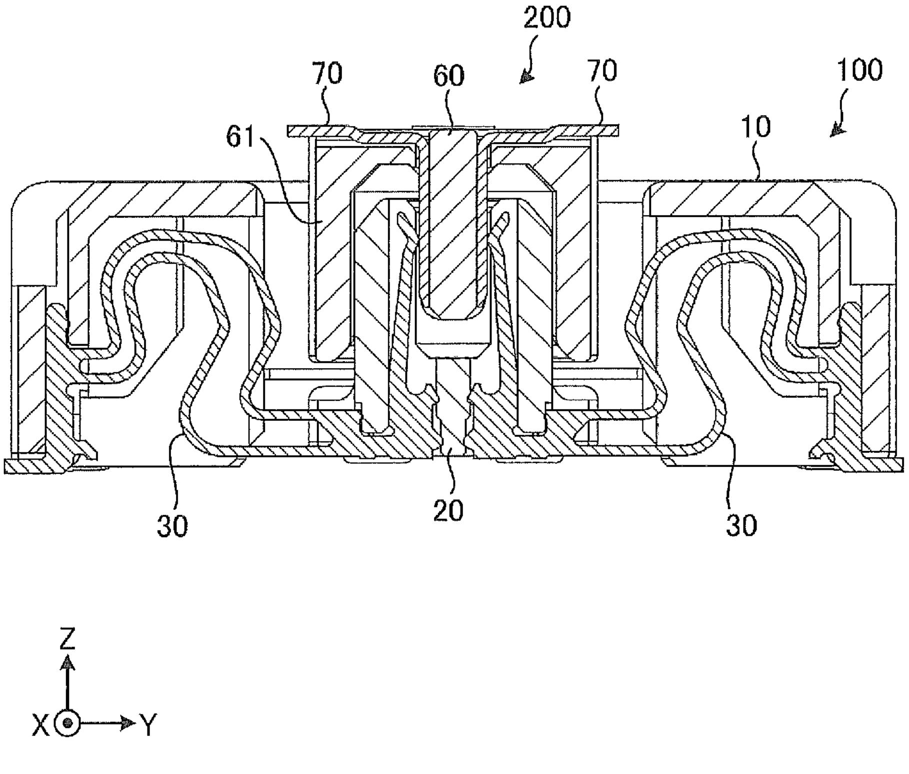
FIG. 3 is a cross-sectional view taken along line A-A in FIG. 2.
Figure 4:
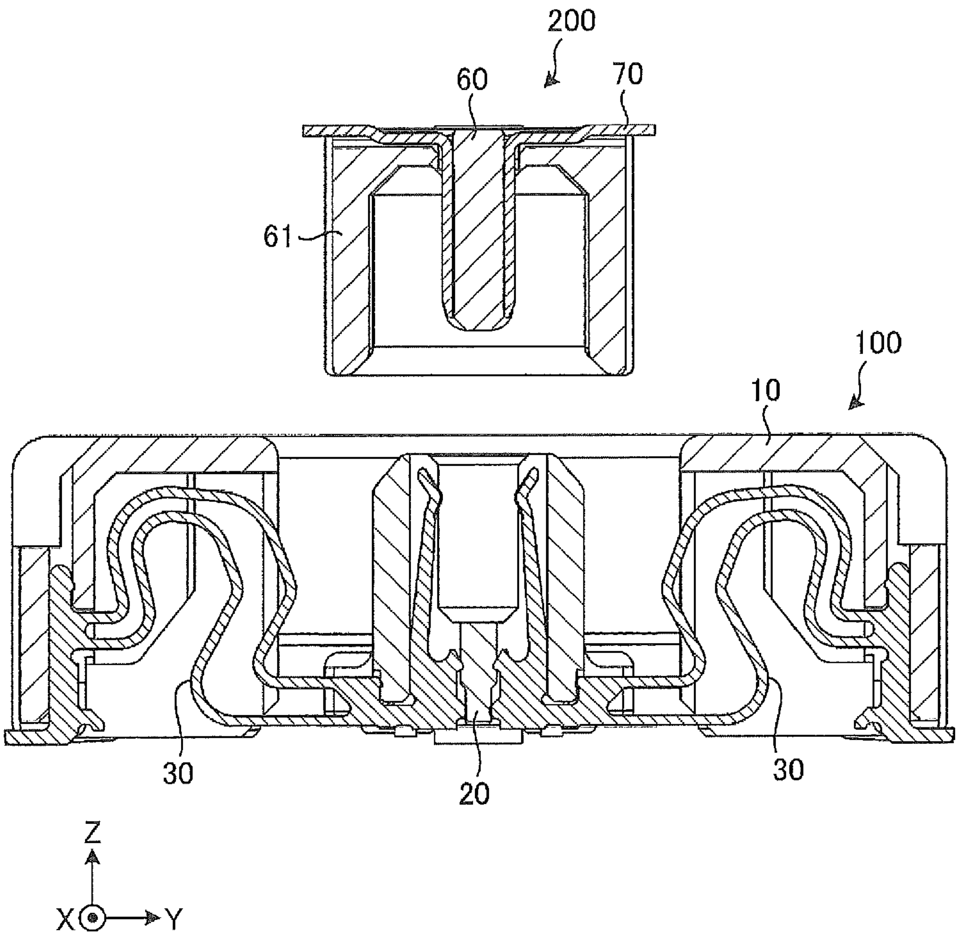
FIG. 4 is a cross-sectional view of the connector and the other connector of the embodiment before the mating.
Figure 5:
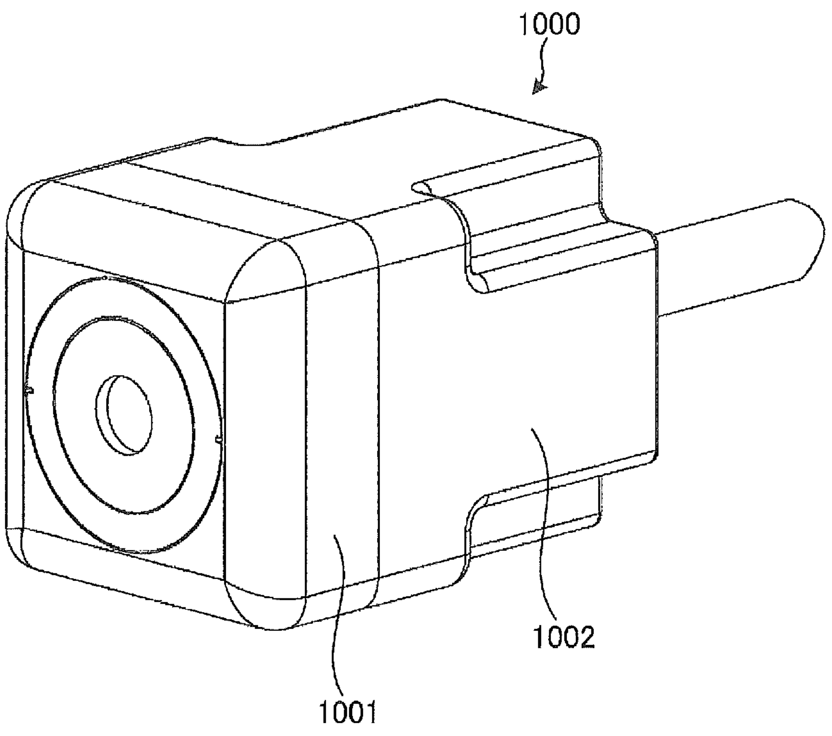
FIG. 5 is a perspective view of an electronic device provided with the connector of the embodiment.
Figure 6:
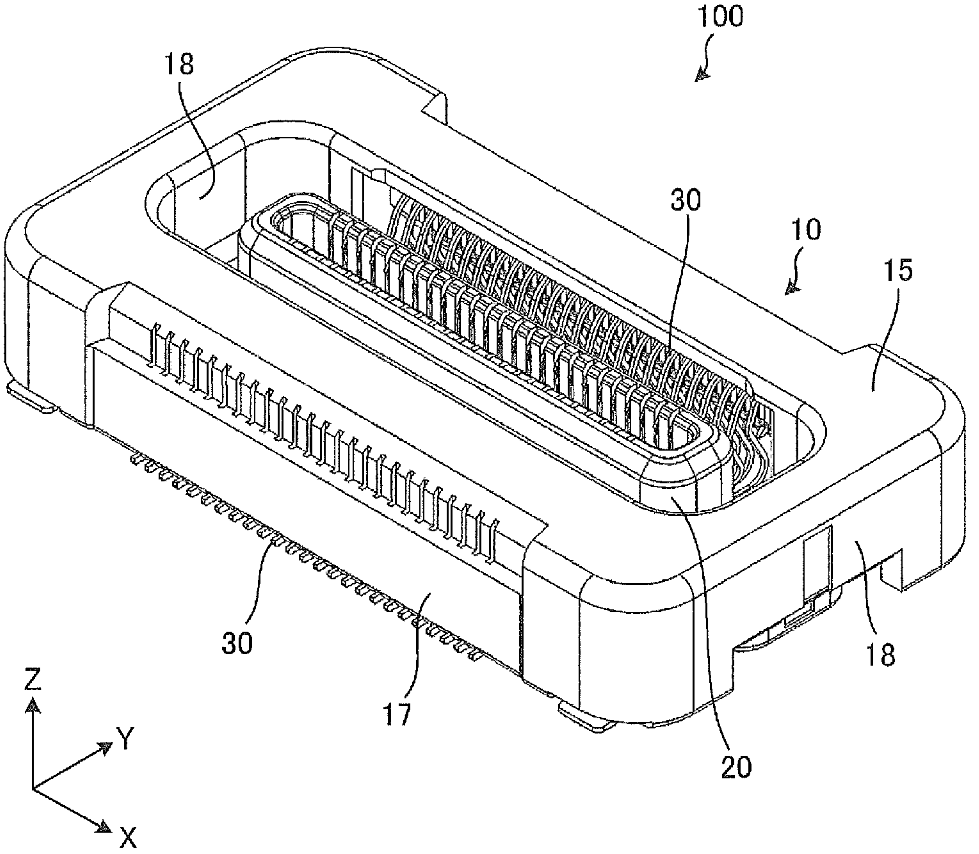
FIG. 6 is a perspective view of the connector of the embodiment.
Figure 7:
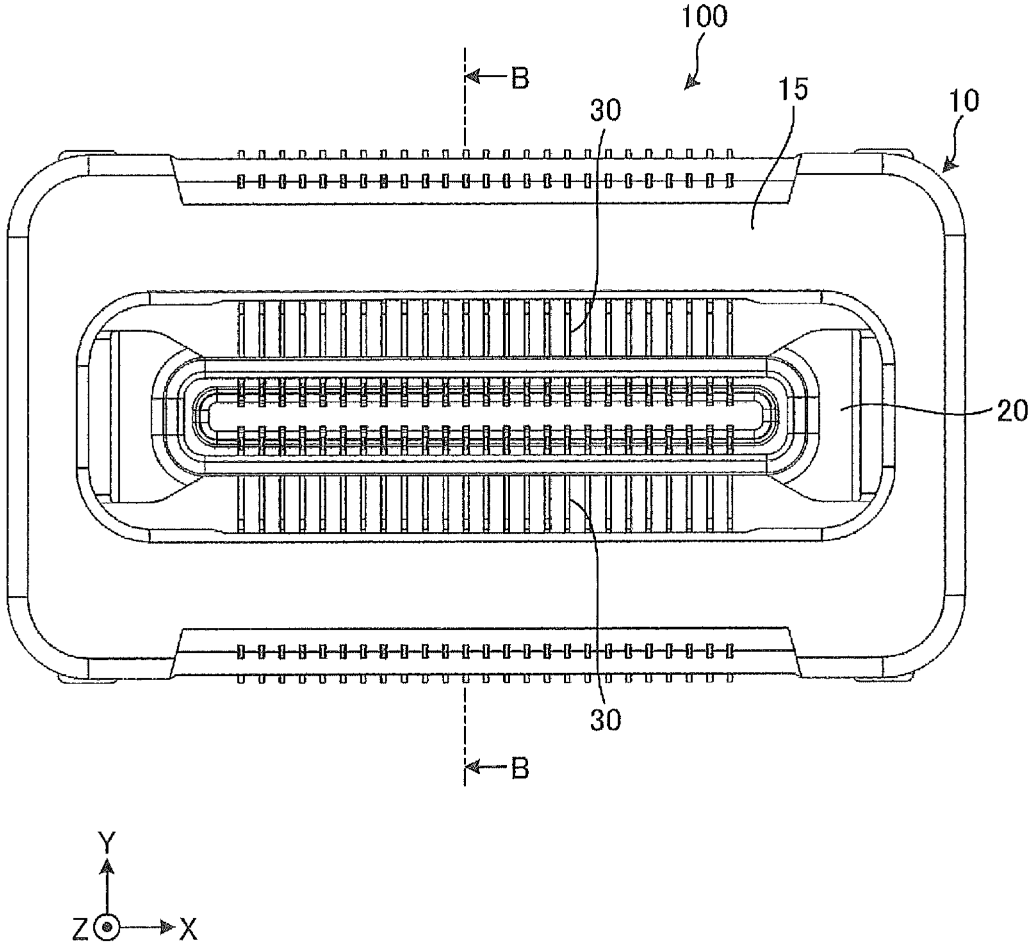
FIG. 7 is a plan view of the connector of the embodiment.
Figure 8:
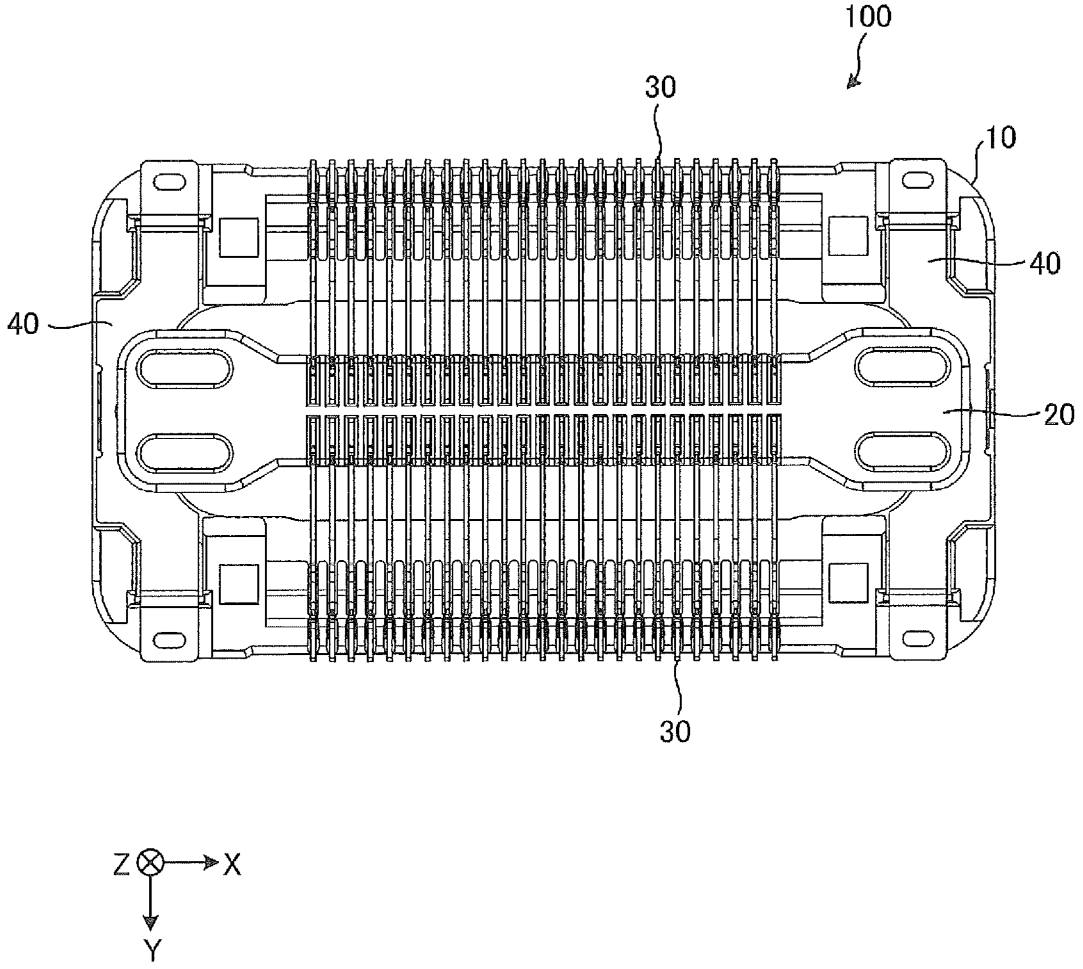
FIG. 8 is a bottom view of the connector of the embodiment.
Figure 9:
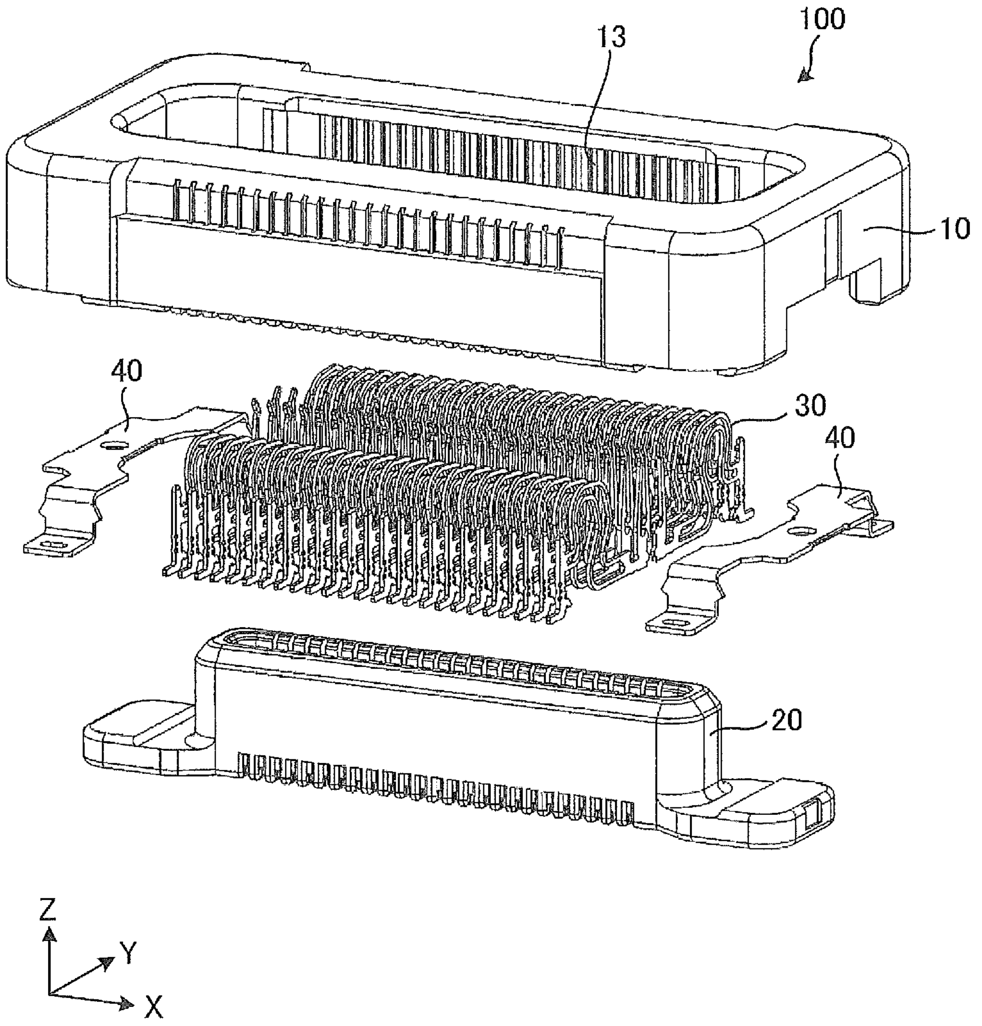
FIG. 9 is an exploded perspective view of the connector of the embodiment.
Figure 10:
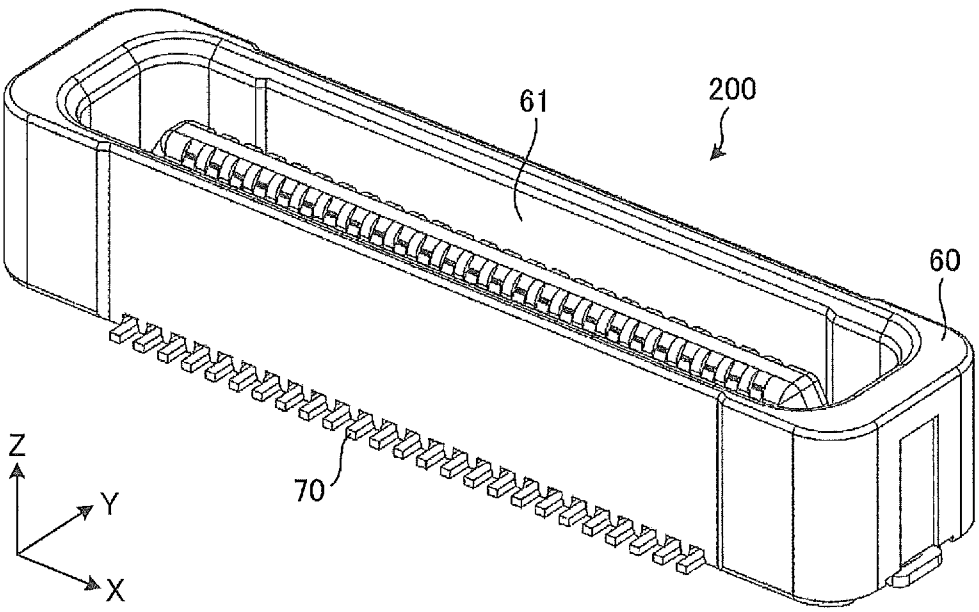
FIG. 10 is a perspective view of the other connector.
Figure 11:
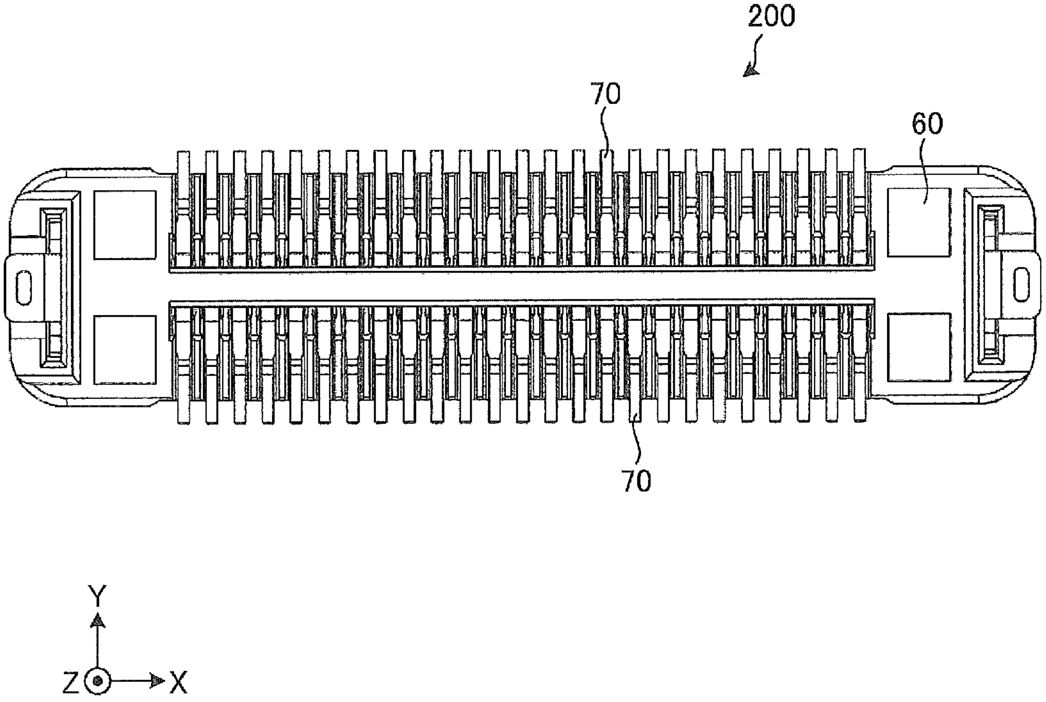
FIG. 11 is a plan view of the other connector.
Figure 12:
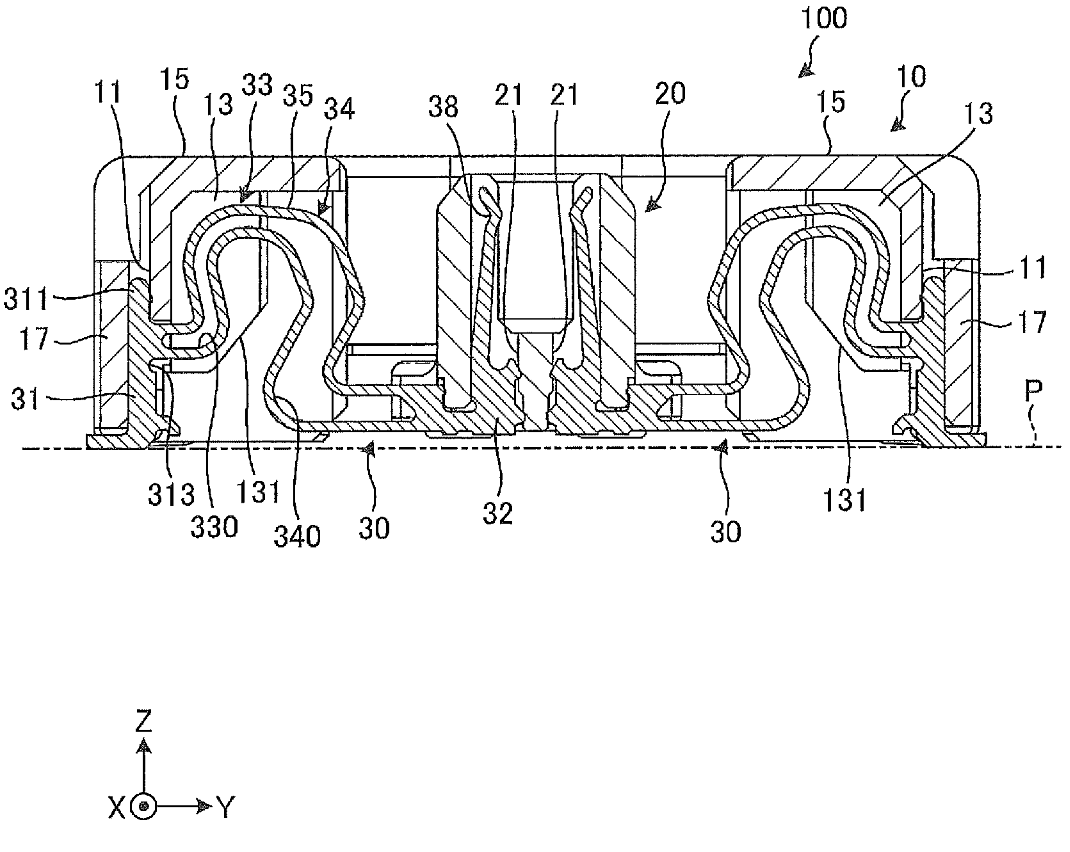
FIG. 12 is a cross-sectional view taken along line B-B in FIG. 7.
Figure 13:
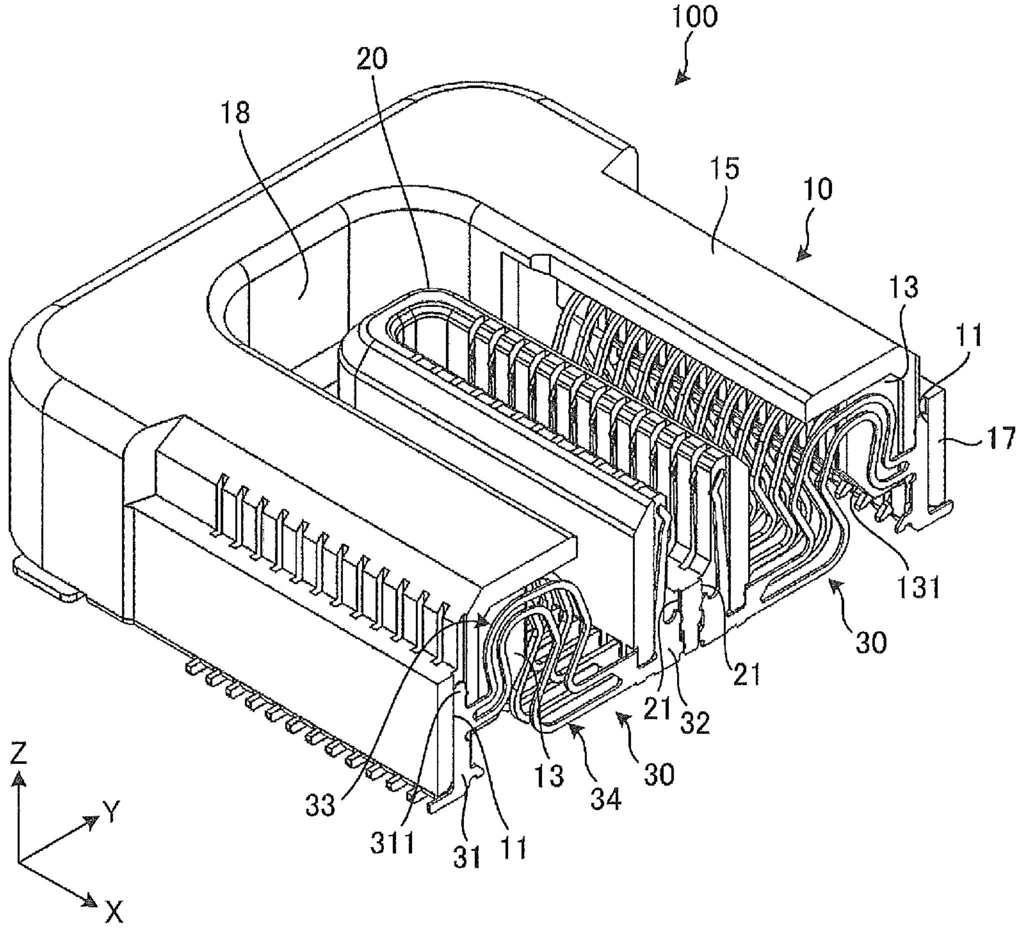
FIG. 13 is a perspective view of the cross section taken along line B-B in FIG. 7.
Figure 14:
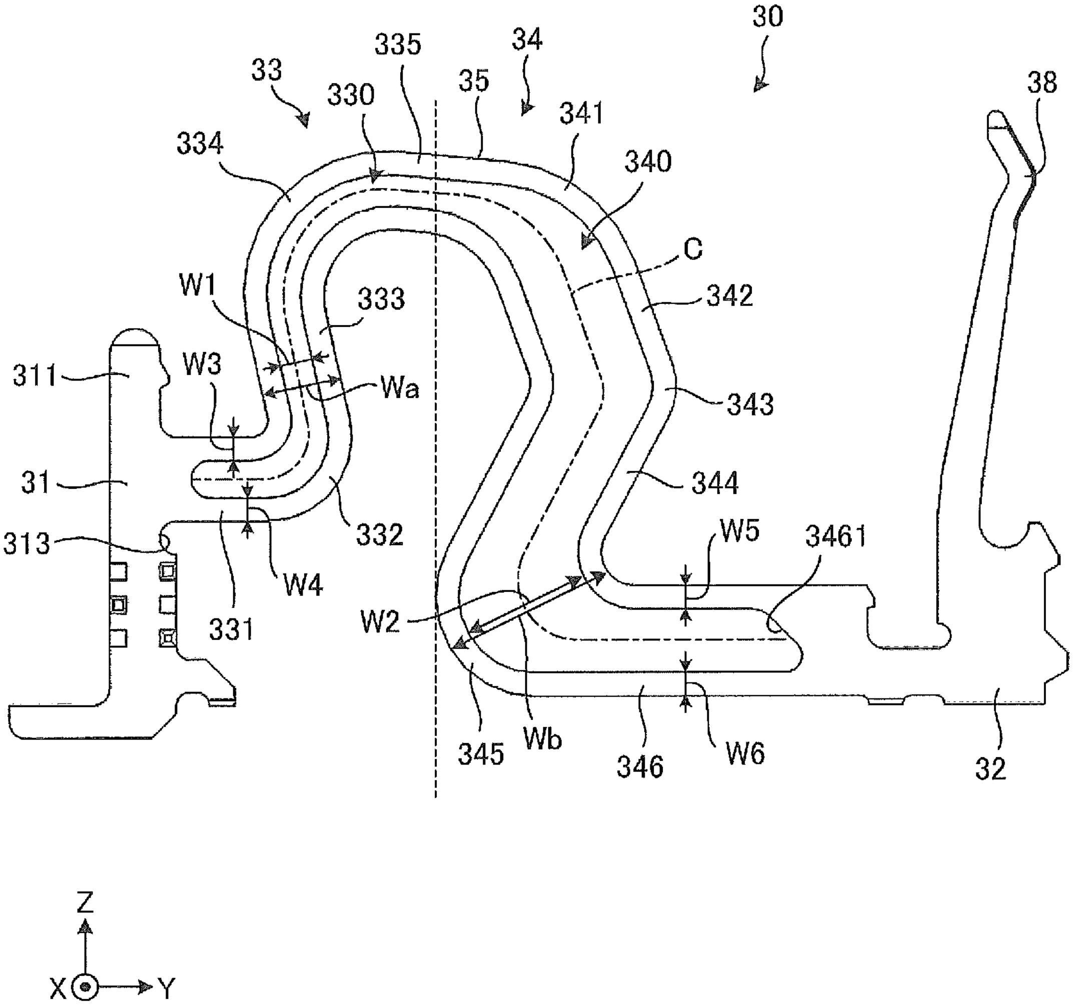
FIG. 14 is a side view of the contact of the embodiment.

FIG. 1 is a perspective view of a connector and another connector of an embodiment after mating. FIG. 2 is a plan view of the connector and the other connector of the embodiment after the mating. FIG. 3 is a cross-sectional view taken along line A-A in FIG. 2. FIG. 4 is a cross-sectional view of the connector and the other connector of the embodiment before the mating. FIG. 5 is a perspective view of an electronic device provided with the connector of the embodiment. FIG. 6 is a perspective view of the connector of the embodiment. FIG. 7 is a plan view of the connector of the embodiment. FIG. 8 is a bottom view of the connector of the embodiment. FIG. 9 is an exploded perspective view of the connector of the embodiment. FIG. 10 is a perspective view of the other connector. FIG. 11 is a plan view of the other connector. FIG. 12 is a cross-sectional view taken along line B-B in FIG. 7. FIG. 13 is a perspective view of the cross section taken along line B-B in FIG. 7. FIG. 14 is a side view of the contact of the embodiment.

An XYZ Cartesian coordinate system is used in the following description. The X axis is an axis parallel to the direction in which a plurality of contacts 30 are arranged. The Z axis is an axis parallel to the direction (mating direction) of the relative movement when the connector 100 and the connector 200 mate with each other. The Y axis is an axis orthogonal to both the X axis and the Z axis. The XY plane is parallel to a substrate 300 and a substrate 400. The Z axis is orthogonal to the substrate 300 and the substrate 400. A direction extending along the X axis is referred to as an X direction. A direction extending along the Y axis is referred to as a Y direction. A direction extending along the Z axis is referred to as a Z direction. Of the Z direction, a direction from the substrate 300 toward the substrate 400 is referred to as a +Z direction, and a direction opposite to the +Z direction is referred to as a −Z direction. An XY-plan view means a view in the mating direction. A YZ-plan view means a view in an arrangement direction.

The X direction is a direction in which the plurality of contacts 30 are arranged. The X direction is an arrangement direction in which the plurality of contacts 30 are arranged. The X direction can also be regarded as a long side direction of a fixed insulator 10 in plan view orthogonal to the substrate 300 and the substrate 400. The Y direction is a direction orthogonal to the substrate 300 and the substrate 400 and orthogonal to the direction in which the plurality of contacts 30 are arranged. The Y direction can also be regarded as a short side direction of the fixed insulator 10 in plan view orthogonal to the substrate 300 and the substrate 400. The Z direction is the direction (mating direction) of the relative movement when the connector 100 and the connector 200 mate with each other. The Z direction can also be regarded as a direction orthogonal to the substrate 300 and the substrate 400.

As illustrated in FIG. 1, the connector 100 of the embodiment is attached to the substrate 300. The connector 100 is connected with the other connector 200. The connector 200 is attached to the substrate 400. The substrate 300 and the substrate 400 are connected to each other via the connector 100 and the connector 200. The substrate 300 and the substrate 400 are printed circuit boards (PCBs) and include a plurality of electronic components. Note that the substrate 300 and the substrate 400 may be flexible printed circuits (FPCs).

An electronic device 1000 illustrated in FIG. 5 includes a connector 100 and a connector 200. The electronic device 1000 is an in-vehicle camera. The electronic device 1000 includes a lens unit 1001 including a lens, and an electric wire unit 1002 including an electric wire. The connector 100 provided to one of the lens unit 1001 and the electric wire unit 1002 is connected to the connector 200 provided to the other one thereof. Note that the electronic device to which the connector 100 and the connector 200 are applied may not necessarily be an in-vehicle camera, and is not particularly limited.

As illustrated in FIG. 1, the connector 100 includes the fixed insulator 10, a fixture 40, a movable insulator 20, and the plurality of contacts 30. The connector 200 includes an insulator 60, a fixture 80, and a plurality of contacts 70.

The contacts 30 are fixed to the substrate 300 by soldering or the like. The plurality of contacts 30 are positioned by the fixed insulator 10 and the movable insulator 20. The plurality of contacts 30 are arranged along one direction (the X direction). The contacts 70 are fixed to the substrate 400 by soldering or the like. The plurality of contacts 70 are positioned by the insulator 60. The plurality of contacts 70 are arranged along one direction (the X direction). When the contacts 70 come into contact with the contacts 30, the substrate 300 and the substrate 400 are electrically connected to each other.

When the connector 100 and the connector 200 mate with each other, there is a possibility of misalignment with each other. In such a case, force is applied from the connector 200 to the movable insulator 20 that mates with the connector 200. At the same time, the contacts 30 supported by the movable insulator 20 are pushed to a certain degree by the contacts 70 supported by the insulator 60. Thus, when force is indirectly applied to a contact portion between the contacts 30 and the substrate 300, the contact portion between the contacts 30 and the substrate 300 might become damaged. In the connector 100 of the present embodiment, due to an elastic portion of the contacts 30, the movable insulator 20 supporting the contacts 30 moves relative to the fixed insulator 10. As a result, the force generated in the contact portion between the contacts 30 and the substrate 300 is suppressed. Furthermore, by the misalignment during the mating of the connector 100 and the connector 200 being absorbed, workability can be improved. Such a connector 100 is known as a floating connector.

The insulator 60 is a member formed of an insulating material. The insulator 60 is formed, for example, of synthetic resin. As illustrated in FIG. 10, the insulator 60 includes sidewalls 61 parallel to the XZ plane. The sidewalls 61 cover a part of the movable insulator 20 from both sides in the Y direction. The sidewalls 61 are disposed between the movable insulator 20 and a second arm portion 34 of the contact 30. The fixture 80 is a substantially L-shaped fitting. The fixture 80 is supported by the insulator 60. The fixture 80 is disposed on the inner side of the insulator 60. The fixture 80 is fixed to the substrate 400 by soldering or the like.

As illustrated in FIGS. 6 to 9, the fixed insulator 10 is a frame-shaped member formed of an insulating material. The fixed insulator 10 is formed, for example, of synthetic resin. The fixture 40 is a substantially U-shaped fitting. The fixture 40 is supported by the fixed insulator 10. The fixture 40 is disposed on the inner side of the fixed insulator 10. The fixture 40 is fixed to the substrate 300 by soldering or the like.

As illustrated in FIGS. 6 to 13, the fixed insulator 10 includes two first sidewalls 17, two second sidewalls 18, a top wall 15, a plurality of first fixing grooves 11, and a plurality of partition walls 13.

As illustrated in FIG. 6, the first sidewalls 17 are walls parallel to the XZ plane. The two first sidewalls 17 are arranged spaced apart in the Y direction. The second sidewalls 18 are walls that are parallel to the YZ plane. The two second sidewalls 18 are arranged spaced apart in the X direction. The second sidewalls 18 are connected to end portions of the two first sidewalls 17. The two first sidewalls 17 and the two second sidewalls 18 are arranged to be in a frame shape in the XY-plan view. The top wall 15 is a wall parallel to the XY plane. The top wall 15 is disposed in the +Z direction of the first sidewalls 17 and the second sidewalls 18. The top wall 15 covers at least a part of the contacts 30. The top wall 15 overlaps with at least a part of the contacts 30 in the XY-plan view.

As illustrated in FIG. 12, the first sidewalls 17 are provided with the first fixing grooves 11. The first fixing grooves 11 extend in the Z direction. The longitudinal direction of the first fixing grooves 11 is parallel to the Z direction. The plurality of first fixing grooves 11 are arranged at an equal interval along the X direction.

As illustrated in FIG. 13, the partition walls 13 are walls that are parallel to the YZ plane. The partition walls 13 are connected to the first sidewalls 17 and the top wall 15. The plurality of partition walls 13 are arranged at an equal interval along the X direction. The interval between the plurality of partition walls 13 arranged is equal to the interval between the plurality of first fixing grooves 11 arranged. The partition walls 13 are also referred to as inter-electrode walls. As illustrated in FIG. 12, the partition wall 13 includes an inclined surface 131. The inclined surface 131 inclines away from the second arm portion 34 of the contact 30 described later as it gets closer to a virtual plane P. The virtual plane P is a plane that is parallel to the XY plane and passes through bottom surfaces of a plurality of first base portions 31 described later.

As illustrated in FIG. 6, the movable insulator 20 is formed of an insulating material. The movable insulator 20 is formed, for example, of synthetic resin. The movable insulator 20 is disposed on the inner side of the fixed insulator 10. The movable insulator 20 is not fixed relative to the substrate 300. The movable insulator 20 is connected to the fixed insulator 10 via the contacts 30. The movable insulator 20 can move relative to the fixed insulator 10 through elastic deformation of the contacts 30.

As illustrated in FIG. 12, the movable insulator 20 includes second fixing grooves 21. The second fixing grooves 21 extend in the Z direction. The longitudinal direction of the second fixing grooves 21 is parallel to the Z direction. A plurality of the second fixing grooves 21 are arranged at an equal interval along the X direction.

As illustrated in FIG. 13, the contacts 30 are plate-shaped members formed of metal. The thickness direction of the contacts 30 is parallel to the X direction (the arrangement direction). The contacts 30 have a uniform thickness (length in the X direction). All the surfaces of the contacts 30 oriented in the X direction are planar surfaces that are parallel to the YZ plane. The thickness (length in the X direction) of the contacts 30 is smaller than the shortest length of the contacts 30 in a direction orthogonal to the X direction. The contacts 30 are formed, for example, by punching a metal plate using a press machine. The contacts 30 are of what is known as a fork type. As illustrated in FIG. 14, the contact 30 includes the first base portion 31, a second base portion 32, a first arm portion 33, the second arm portion 34, and a contact portion 38.

As illustrated in FIG. 12, the first base portion 31 includes a protruding portion 311 that is supported by a corresponding one of the first fixing grooves 11 of the fixed insulator 10. The protruding portion 311 is pressed into the first fixing groove 11. The bottom surface of the first base portion 31 is connected to the substrate 300. The first base portion 31 includes a recessed portion 313. The recessed portion 313 is disposed at a portion to be connected with the first arm portion 33 of the first base portion 31. With the recessed portion 313 thus provided, the load on a portion (portion of soldering) of the contact 30 fixed to the substrate 300, as a result of the movement of the movable insulator 20, is reduced.

As illustrated in FIG. 12, the second base portion 32 is supported by a corresponding one of the second fixing grooves 21 of the movable insulator 20. The second base portion 32 is pressed into the second fixing groove 21. The contact portion 38 comes into contact with the contact 70 of the connector 200.

As illustrated in FIG. 12, the first arm portion 33 is connected only to the first base portion 31 and the second arm portion 34. As illustrated in FIG. 13, the first arm portion 33 is disposed between two partition walls 13 adjacent to each other in the X direction. As illustrated in FIG. 14, the first arm portion 33 has a uniform width. The width is the length in a direction orthogonal to a centerline C. The centerline C is a line connecting two points at an equal distance from two outer circumference surfaces, of the first arm portion 33 and the second arm portion 34, oriented in a direction orthogonal to the thickness direction (X direction). At a position where the centerline C is a curved line, the width is a length in a direction orthogonal to the tangent of the centerline C. The width can also be regarded as a length in a direction orthogonal to the direction in which the first arm portion 33 and the second arm portion 34 extend.

As illustrated in FIG. 14, the first arm portion 33 includes a first slit 330, a first linear portion 331, a first bent portion 332, a second linear portion 333, a second bent portion 334, and a connection portion 335. A dashed line in FIG. 14 indicates a position of an end portion of the partition wall 13 in the Y direction that is farthest from the first sidewall 17. A section on the left side of the dashed line in FIG. 14 is a space sandwiched between the partition walls 13. A section on the right side of the dashed line in FIG. 14 is outside of the space sandwiched between the partition walls 13.

As illustrated in FIG. 14, the first slit 330 is a slit that is formed through the first arm portion 33 in the X direction. The number of first slits 330 is one. The first slit 330 has a uniform width except for the end portion. The center position of the first slit 330 in the width direction is the same as the center position of the first arm portion 33 in the width direction. Thus, portions of the first arm portion 33 on both sides of the first slit 330 have uniform widths except for the end portions and are equal to each other. In other words, a width W3 of one portion of the first slit 330 in the first arm portion 33 is equal to a width W4 of the other portion of the first slit 330 in the first arm portion 33.

As illustrated in FIG. 14, the first linear portion 331 is connected to the first base portion 31. The first linear portion 331 is linear in the YZ-plan view. The two outer circumference surfaces of the first linear portion 331 oriented in the direction orthogonal to the thickness direction are planar and parallel to each other.

As illustrated in FIG. 14, the first bent portion 332 is connected to the first linear portion 331. The first bent portion 332 is curved in the YZ-plan view. The first bent portion 332 is bent in the YZ-plan view. The two outer circumference surfaces of the first bent portion 332 oriented in the direction orthogonal to the thickness direction are curved. The first bent portion 332 is convex toward the second base portion 32.

As illustrated in FIG. 14, the second linear portion 333 is connected to the first bent portion 332. The second linear portion 333 is linear in the YZ-plan view. The two outer circumference surfaces of the second linear portion 333 oriented in the direction orthogonal to the thickness direction are planar and parallel to each other.

As illustrated in FIG. 14, the second bent portion 334 is connected to the second linear portion 333. The second bent portion 334 is curved in the YZ-plan view. The second bent portion 334 is bent in the YZ-plan view. The two outer circumference surfaces of the second bent portion 334 oriented in the direction orthogonal to the thickness direction are curved. The second bent portion 334 is convex toward the first base portion 31.

As illustrated in FIG. 14, the connection portion 335 is connected to the second bent portion 334. The connection portion 335 is linear in the YZ-plan view. The two outer circumference surfaces of the connection portion 335 oriented in the direction orthogonal to the thickness direction are planar and parallel to each other.

As illustrated in FIG. 12, the second arm portion 34 is connected only to the first arm portion 33 and the second base portion 32. As illustrated in FIG. 13, the second arm portion 34 is disposed closer to the second base portion 32 than the partition wall 13 is. The second arm portion 34 is disposed outside the space sandwiched between the two partition walls 13. As illustrated in FIG. 14, the width of the second arm portion 34 is not uniform. The second arm portion 34 has the smallest width at a portion connected to the first arm portion 33.

As illustrated in FIG. 14, the second arm portion 34 includes a second slit 340, a connection portion 341, a first linear portion 342, a first bent portion 343, a second linear portion 344, a second bent portion 345, and a third linear portion 346.

As illustrated in FIG. 14, the second slit 340 is a slit that is formed through the second arm portion 34 in the X direction. The number of second slits 340 is one. The second slit 340 is connected to the first slit 330. The width of the second slit 340 is not uniform. The center position of the first slit 330 in the width direction is the same as the center position of the second arm portion 34 in the width direction. Portions of the second arm portion 34 on both sides of the second slit 340 have uniform widths except for the end portions and are equal to each other. In other words, a width W5 of one portion of the second slit 340 in the second arm portion 34 is equal to a width W6 of the other portion of the second slit 340 in the second arm portion 34. The widths 5 and W6 are equal to the width W3 and width 4 of the first arm portion 33.

As illustrated in FIG. 14, the connection portion 341 is connected to the connection portion 335 of the first arm portion 33. A portion of the outer circumference surface of the connection portion 341 oriented in the +Z direction is planar. The outer circumference surface of the connection portion 341 oriented in the +Z direction and the outer circumference surface of the connection portion 335 oriented in the +Z direction form planar facing surfaces 35. The facing surfaces 35 face the top wall 15 of the fixed insulator 10.

As illustrated in FIG. 14, the first linear portion 342 is connected to the connection portion 341. The first linear portion 342 is linear in the YZ-plan view. The two outer circumference surfaces of the first linear portion 342 oriented in the direction orthogonal to the thickness direction are planar and parallel to each other.

As illustrated in FIG. 14, the first bent portion 343 is connected to the first linear portion 342. The first bent portion 343 is curved in the YZ-plan view. The first bent portion 343 is bent in the YZ-plan view. The two outer circumference surfaces of the first bent portion 343 oriented in the direction orthogonal to the thickness direction are curved. The first bent portion 343 is convex toward the second base portion 32.

As illustrated in FIG. 14, the second linear portion 344 is connected to the first bent portion 343. The second linear portion 344 is linear in the YZ-plan view. The two outer circumference surfaces of the second linear portion 344 oriented in the direction orthogonal to the thickness direction are planar and parallel to each other.

As illustrated in FIG. 14, the second bent portion 345 is connected to the second linear portion 344. The second bent portion 345 is curved in the YZ-plan view. The second bent portion 345 is bent in the YZ-plan view. The two outer circumference surfaces of the second bent portion 345 oriented in the direction orthogonal to the thickness direction are curved. The second bent portion 345 is convex toward the first base portion 31.

As illustrated in FIG. 14, the third linear portion 346 is connected to the second bent portion 345 and the second base portion 32. The third linear portion 346 is linear in the YZ-plan view. The two outer circumference surfaces of the third linear portion 346 oriented in the direction orthogonal to the thickness direction are planar and parallel to each other. The third linear portion 346 includes an inclined inner wall 3461. The inclined inner wall 3461 is an inner wall of the third linear portion 346 that faces the second slit 340. The inclined inner wall 3461 is inclined to reduce the width of the second slit 340 toward the second base portion 32.

As illustrated in FIG. 14, the second arm portion 34 has the largest width at the second bent portion 345. The second slit 340 has the largest width at the second bent portion 345. A largest width Wa of the first arm portion 33 is smaller than a largest width Wb of the second arm portion 34. A largest width W1 of the first slit 330 is smaller than a largest width W2 of the second slit 340.

Figure 15:
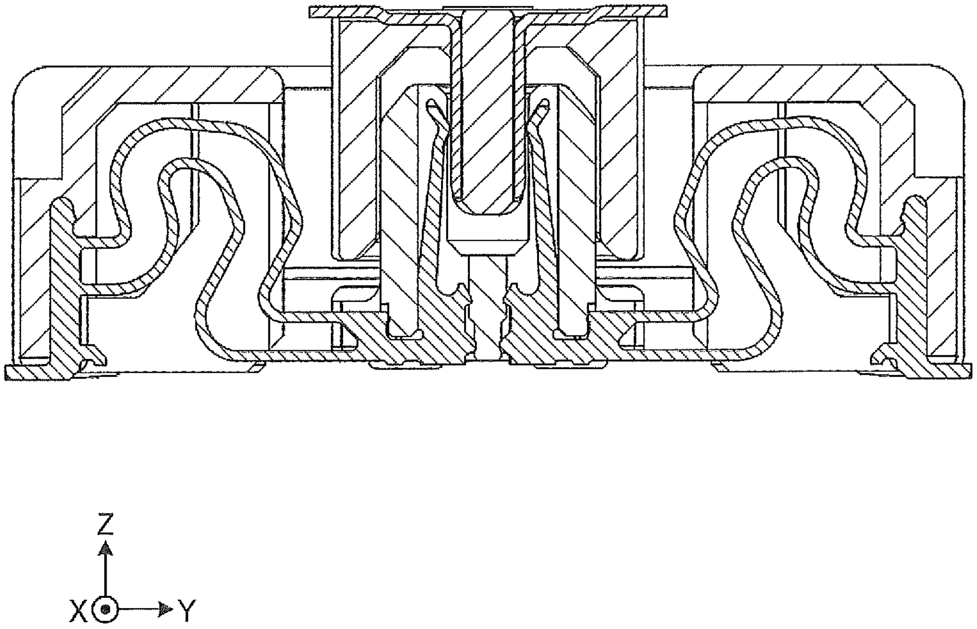
FIG. 15 is a schematic view of a connector of Comparative Example.
Figure 16:
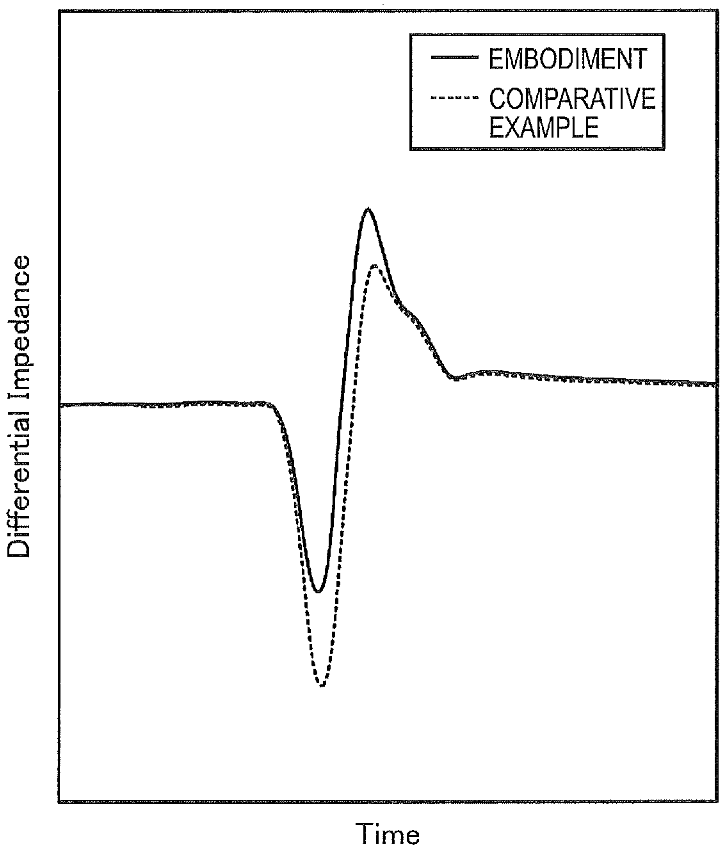
FIG. 16 is a graph illustrating differential impedance of the connector of the embodiment and the connector of Comparative Example.

FIG. 15 is a schematic view of a connector of Comparative Example. FIG. 16 is a graph illustrating differential impedance of the connector of the embodiment and the connector of Comparative Example.

The contacts 30 are required to be capable of supporting high speed transmission. In this context, the characteristic impedance of the contacts 30 needs to be adjusted with higher accuracy. However, improvement in the adjustment of the characteristic impedance of the contacts 30 is not an easy task. As illustrated in FIG. 15, contacts of Comparative Example have a shape different from that of the contacts 30 of the present embodiment. In Comparative Example, the largest width of the portion corresponding to the first arm portion 33 is equal to the largest width of the portion corresponding to the second arm portion 34.

FIG. 16 illustrates the characteristic impedance of the contacts 30 of the present embodiment and the characteristic impedance of the contacts of Comparative Example under the same experimental conditions. As illustrated in FIG. 16, a change in characteristic impedance of the contacts of Comparative Example is greater than a change in characteristic impedance of contacts 30 of the present embodiment. With the contacts 30 of the present embodiment, a change in the characteristic impedance of the contacts 30 can be suppressed. Specifically, the characteristic impedance of the contacts 30 tends to decrease excessively in the portion (first arm portion 33) of the contacts 30 disposed in the space sandwiched between the partition walls 13. In the contacts 30 of the present embodiment, the largest width Wa of the first arm portion 33 is smaller than the largest width Wb of the second arm portion 34. With this configuration, excessive reduction of the characteristic impedance of the contacts 30 is suppressed.

Note that the shape of the contacts 30 is not limited to the shape described above. The contacts 30 may have a shape different from the shape described above, as long as the condition that at least the largest width of the first arm portion 33 is smaller than the largest width of the second arm portion 34 is satisfied. Furthermore, the number of each of the first slits 330 and the second slits 340 does not necessarily need to be one. The contacts 30 may include a plurality of the first slits 330 or a plurality of the second slits 340.

The protruding portion 311 of the contact 30 does not need to be pressed into the first fixing groove 11 of the fixed insulator 10. For example, the protruding portion 311 and the first fixing groove 11 may be integrally formed by insert molding. The second base portion 32 of the contact 30 does not need to be pressed into the second fixing groove 21 of the movable insulator 20. For example, the second base portion 32 and the second fixing groove 21 may be integrally formed by insert molding. Furthermore, the protruding portion 311 and the first fixing groove 11 may be integrally formed by insert molding, and the second base portion 32 and the second fixing groove 21 may be integrally formed by insert molding.

As described above, the connector 100 includes the fixed insulator 10, the movable insulator 20, and the plurality of contacts 30. The movable insulator 20 is disposed on the inner side of the fixed insulator 10 and is movable relative to the fixed insulator 10. The contacts 30 are attached to the fixed insulator 10 and the movable insulator 20. The fixed insulator 10 includes the plurality of first fixing grooves 11 disposed along the arrangement direction (X direction) in which the plurality of contacts 30 are arranged, and the partition walls 13 each disposed between two adjacent contacts 30. The movable insulator 20 includes the plurality of second fixing grooves 21 disposed along the arrangement direction (X direction). The contacts 30 each include the first base portion 31 supported by a corresponding one of the first fixing grooves 11, the second base portion 32 supported by a corresponding one of the second fixing grooves 21, the first arm portion 33 connected to the first base portion 31 and disposed between two corresponding adjacent ones of the partition walls 13, and the second arm portion 34 connected to the first arm portion 33 and the second base portion 32. A largest width Wa of the first arm portion 33 is smaller than a largest width Wb of the second arm portion 34.

To support transmission of a higher speed, adjustment of the characteristic impedance of the connector with an even higher accuracy has been demanded. Unfortunately, it may be difficult to finely adjust the characteristic impedance of the contacts of the connector of Patent Document 1. Thus, there has been a demand for a connector that enables improvement in flexibility and adjustment of the characteristic impedance of the contacts with higher accuracy.

Due to the largest width Wa of the first arm portion 33 being smaller than the largest width Wb of the second arm portion 34, elastic deformation of the contact 30 is facilitated. Thus, the movement of the movable insulator 20 is facilitated when the connector 100 and the other connector 200 mate or are in the mating state. With the connector 100, flexibility under the floating condition can be improved. Furthermore, due to the largest width W1 of the first slit 330 being smaller than the largest width W2 of the second slit 340, excessive reduction of the characteristic impedance of the first arm portion 33 sandwiched between the partition walls 13 is suppressed. As a result, the characteristic impedance of the contacts 30 can be adjusted with higher accuracy. Thus, the connector 100 of the present embodiment enables improvement in flexibility and adjustment of the characteristic impedance of the contacts 30 with higher accuracy.

In the connector 100, the second arm portion 34 is disposed closer to the second base portion 32 than the partition wall 13 is. With this configuration, the movable range of the contacts 30 is increased.

In the connector 100, the thickness direction of the contacts 30 is the arrangement direction. With this configuration, the contacts 30 can be easily produced by punching a metal plate using a press machine.

In the connector 100, at least one of the first arm portion 33 and the second arm portion 34 includes a linear portion (for example, the first linear portion 342) that is linear and a bent portion (for example, the first bent portion 343) that is bent. With this configuration, in the connector 100 of the present embodiment, the movable insulator 20 can move with a stable posture. Furthermore, elastic deformation of the contacts 30 is facilitated. The connector 100 of the present embodiment can further improve flexibility under the floating condition.

In the connector 100, the first arm portion 33 includes the first slit 330 that is a slit formed through the first arm portion 33 in the arrangement direction (X direction). The second arm portion 34 includes the second slit 340 that is a slit formed through the second arm portion 34 in the arrangement direction (X direction). The largest width W1 of the first slit 330 is smaller than the largest width W2 of the second slit 340. With this configuration, elastic deformation of the contacts 30 is further facilitated. With the connector 100, flexibility under the floating condition can be further improved. Furthermore, excessive reduction of the characteristic impedance of the first arm portion 33 sandwiched between the partition walls 13 can be further suppressed. Thus, the connector 100 enables the characteristic impedance of the contacts 30 to be adjusted with higher accuracy.

In the connector 100, the number of first slits 330 and the number of second slits 340 is one. With this configuration, the contacts 30 have a simple shape, and thus can be easily produced. The connector 100 of the present embodiment enables the characteristic impedance of the contacts 30 to be adjusted with higher accuracy.

The widths (the width W3 and the width W4) of the portions of the first arm portion 33 on both sides of the first slit 330 are equal to the widths (the width W5 and the width W6) of the portions of the second arm portion 34 on both sides of the second slit 340. With this configuration, stable electrostatic capacitance between the first slit 330 and the second slit 340 is achieved. Thus, the connector 100 of the present embodiment enables adjustment of the characteristic impedance of the contacts 30 with higher accuracy.

In the connector 100, the second arm portion 34 includes the first bent portion 343 that is convex toward the second base portion 32, and the second bent portion 345 that is convex toward the first base portion 31. With this configuration, elastic deformation of the contacts 30 is facilitated. The connector 100 of the present embodiment can further improve flexibility under the floating condition.

In the connector 100, the second slit 340 has the largest width at the second bent portion 345. With this configuration, elastic deformation of the contacts 30 is facilitated. The connector 100 of the present embodiment can further improve flexibility under the floating condition.

In the connector 100, the second arm portion 34 includes the inclined inner wall 3461 that is inclined to reduce the width of the second slit 340 toward the second base portion 32, between the second base portion 32 and the second bent portion 345. With this configuration, the rigidity of the inclined inner wall 3461 is improved, whereby deformation of the inclined inner wall 3461 while the contacts 30 are pressed into the second fixing grooves 21 of the movable insulator 20 can be suppressed.

In the connector 100, the partition walls 13 each include the inclined surface 131 inclining away from the second arm portion 34 as it gets closer to the virtual plane P passing through the bottom surfaces of the plurality of first base portions 31. With this configuration, the second arm portion 34 is less likely to come into contact with the partition walls 13 while the movable insulator 20 moves. Thus, deformation of the second arm portion 34 can be suppressed, whereby the flexibility of the connector 100 under the floating condition can be further improved. Furthermore, with the connector 100, shaving of the partition walls 13 due to the contact between the second arm portion 34 and the partition walls 13 can be suppressed.

The embodiment according to the present disclosure can be modified without departing from the main point or the scope of the present invention. In addition, the embodiment of the present disclosure and modified examples thereof can be combined as appropriate. For example, the embodiment described above can be modified in the following manner.

First Modified Example

Figure 17:
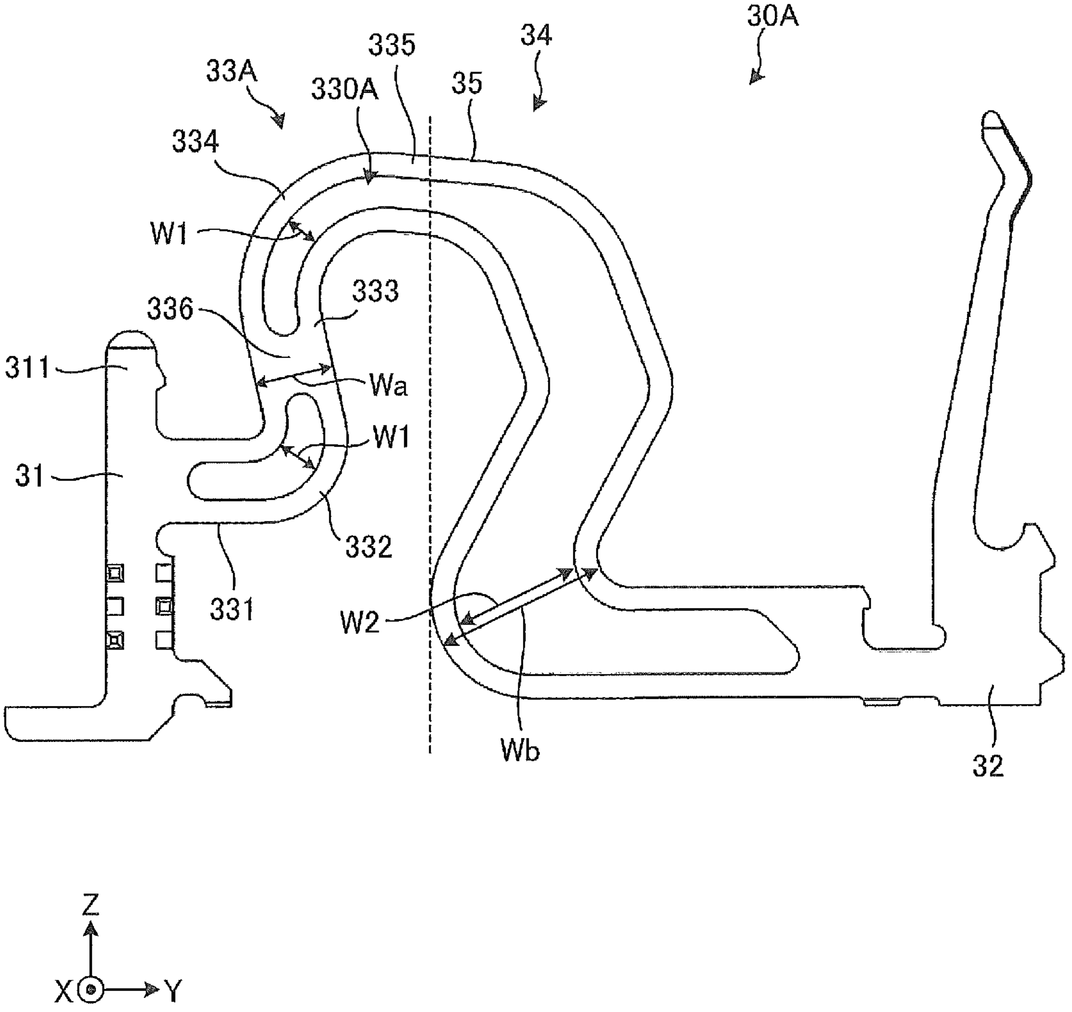
FIG. 17 is a side view of a contact of a first modified example.

FIG. 17 is a side view of a contact of a first modified example. As illustrated in FIG. 17, a contact 30A of the first modified example includes a first arm portion 33A different from the first arm portion 33 described above. Note that the same reference characters are attached to constituent elements that are the same as those described in the embodiment described above, and explanation thereof will not be repeated.

As illustrated in FIG. 17, the first arm portion 33A includes two first slits 330A and an intermediate portion 336. The first slit 330A is a slit that is formed through the first arm portion 33A in the X direction. One first slit 330A is provided from the first linear portion 331 to the second linear portion 333. The other first slit 330A is provided from the second linear portion 333 to the connection portion 335 and is connected to the second slit 340. The first slit 330A has a uniform width except for the end portion. The center position of the first slit 330A in the width direction is the same as the center position of the first arm portion 33A in the width direction. Thus, portions of the first arm portion 33A on both sides of the first slit 330A have uniform widths except for the end portions and are equal to each other. The largest width W1 of the first slit 330A is smaller than the largest width W2 of the second slit 340. The largest width Wa of the first arm portion 33A is smaller than the largest width Wb of the second arm portion 34.

The intermediate portion 336 is disposed in the second linear portion 333. The intermediate portion 336 is provided between the two first slits 330A. Note that the intermediate portion 336 does not need to be provided in the second linear portion 333. The intermediate portion 336 may be provided in the first linear portion 331, the first bent portion 332, the second bent portion 334, or the connection portion 335.

Second Modified Example

Figure 18:
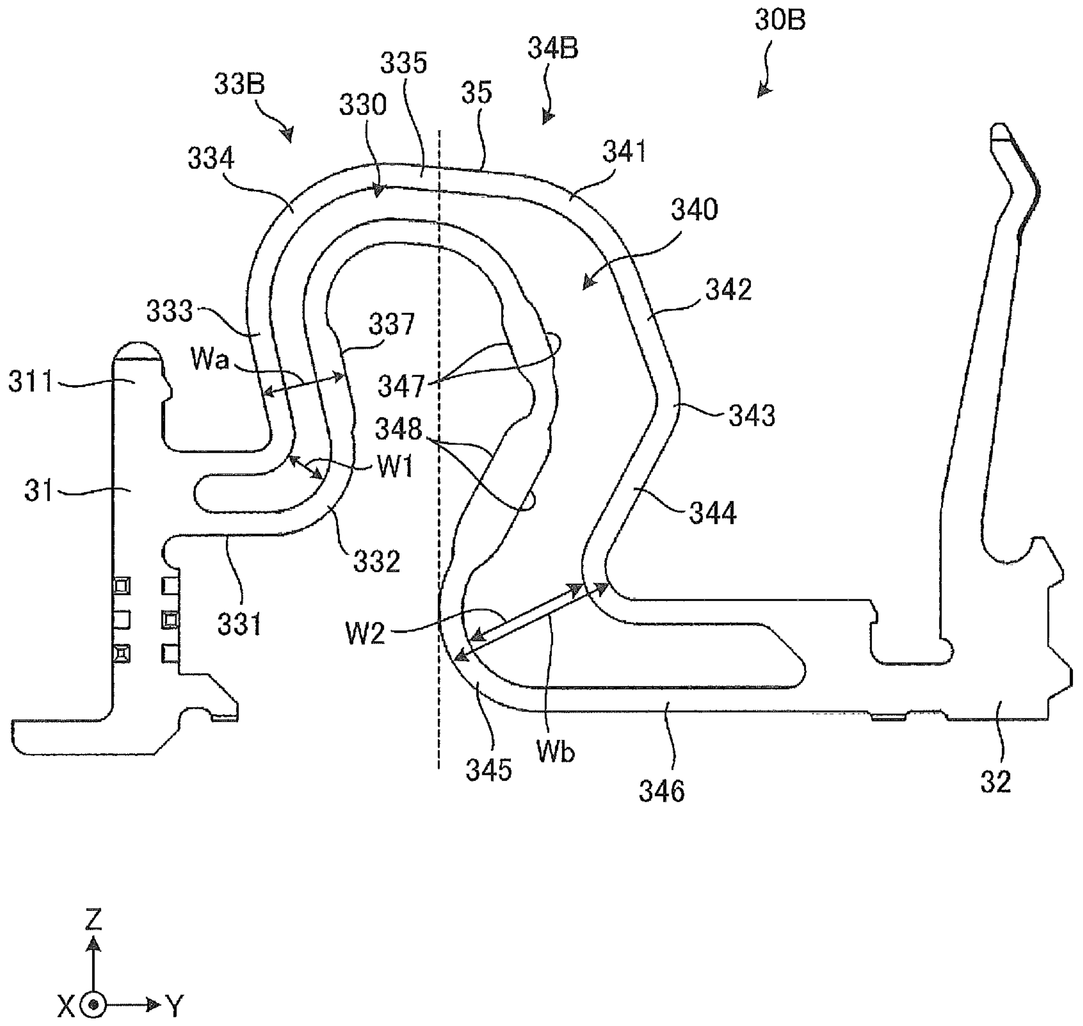
FIG. 18 is a side view of a contact of a second modified example.

FIG. 18 is a side view of a contact of a second modified example. As illustrated in FIG. 18, a contact 30B of the second modified example includes a first arm portion 33B different from the first arm portion 33 described above, and a second arm portion 34B different from the second arm portion 34. Note that the same reference characters are attached to constituent elements that are the same as those described in the embodiment described above, and explanation thereof will not be repeated.

As illustrated in FIG. 18, the first arm portion 33B includes a protruding portion 337. The protruding portion 337 is provided on the outer circumference surface of the second linear portion 333. Thus, the first arm portion 33B does not have a uniform width. Note that the protruding portion 337 may be provided on an inner circumference surface of the second linear portion 333. The protruding portion 337 may also be provided in the first linear portion 331, the first bent portion 332, the second bent portion 334, or the connection portion 335.

The second arm portion 34B includes protruding portions 347 and protruding portions 348. The protruding portions 347 protrude from the outer circumference surface and the inner circumference surface of the first linear portion 342. The protruding portions 348 protrude from the outer circumference surface and the inner circumference surface of the second linear portion 344. Thus, the second arm portion 34B does not have a uniform width. Note that the protruding portions 347 and the protruding portions 348 may be provided in the connection portion 341, the first bent portion 343, the second bent portion 345, or the third linear portion 346. The largest width Wa of the first arm portion 33B is smaller than the largest width Wb of the second arm portion 34B.

Third Modified Example

Figure 19:
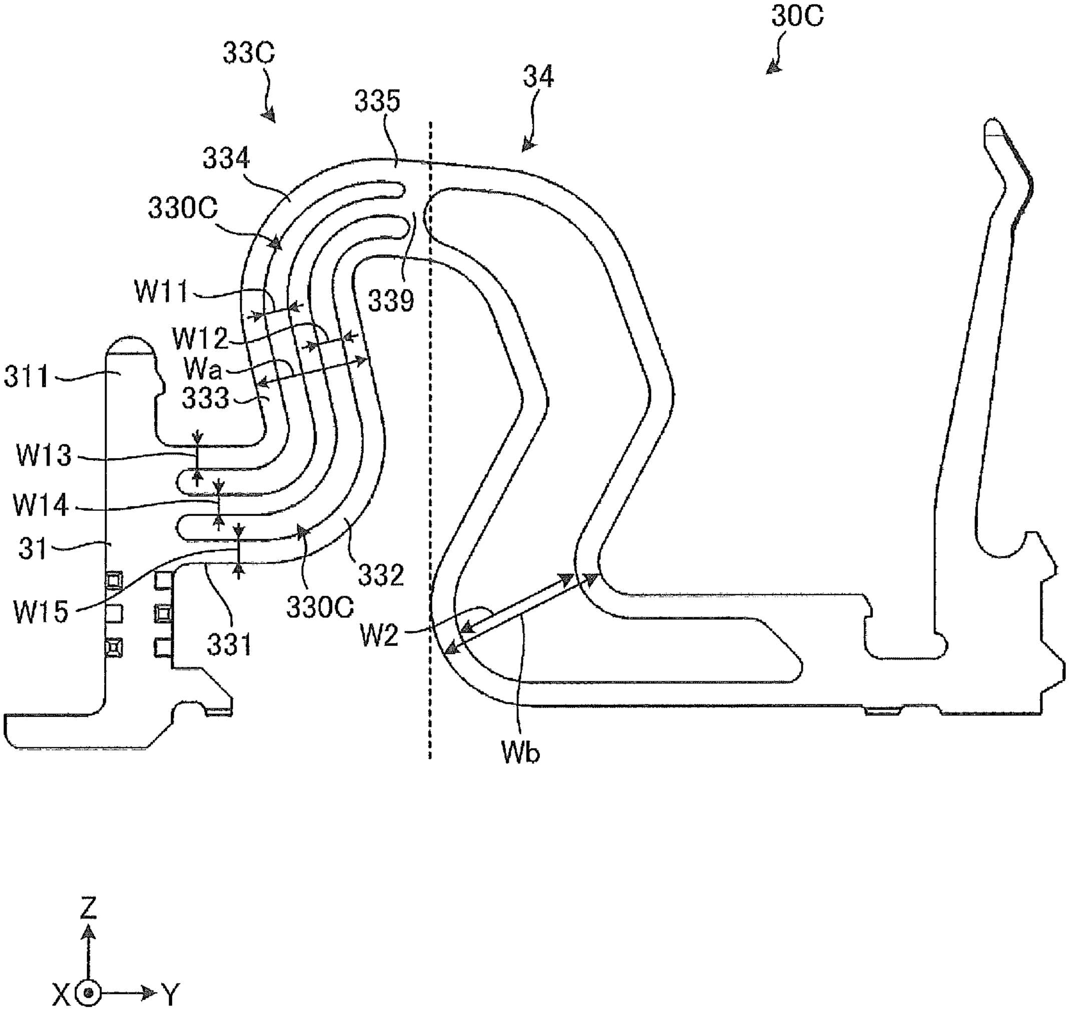
FIG. 19 is a side view of a contact of a third modified example.

FIG. 19 is a side view of a contact of a third modified example. As illustrated in FIG. 19, a contact 30C of the third modified example includes a first arm portion 33C different from the first arm portion 33 described above. Note that the same reference characters are attached to constituent elements that are the same as those described in the embodiment described above, and explanation thereof will not be repeated.

As illustrated in FIG. 19, the first arm portion 33C includes two First slits 330C and an intermediate portion 339. The first slit 330C is a slit that is formed through the first arm portion 33C in the X direction. The two first slits 330C are disposed so as to be adjacent to each other in the width direction. The two first slits 330C are provided from the first linear portion 331 to the connection portion 335. The two first slits 330C have uniform widths except for the end portions. The centers of the first slits 330C in the width direction are disposed on lines that trisect the length of the first arm portion 33C in the width direction. Thus, portions of the first arm portion 33C separated from each other by the first slits 330C have uniform widths except for the end portions and are equal to each other. A width W13, a width W14, and a width W15 illustrated in FIG. 19 are equal to each other. A largest width W11 and a largest width W12 of the first slits 330C are smaller than the largest width W2 of the second slit 340. The largest width Wa of the first arm portion 33C is smaller than the largest width Wb of the second arm portion 34.

The intermediate portion 339 is disposed in the connection portion 335. The intermediate portion 336 is provided between the two first slits 330C and the second slit 340. Note that the intermediate portion 339 does not need to be provided in the connection portion 335. The intermediate portion 339 may be provided in the first linear portion 331, the first bent portion 332, the second linear portion 333, or the second bent portion 334.

Fourth Modified Example

Figure 20:
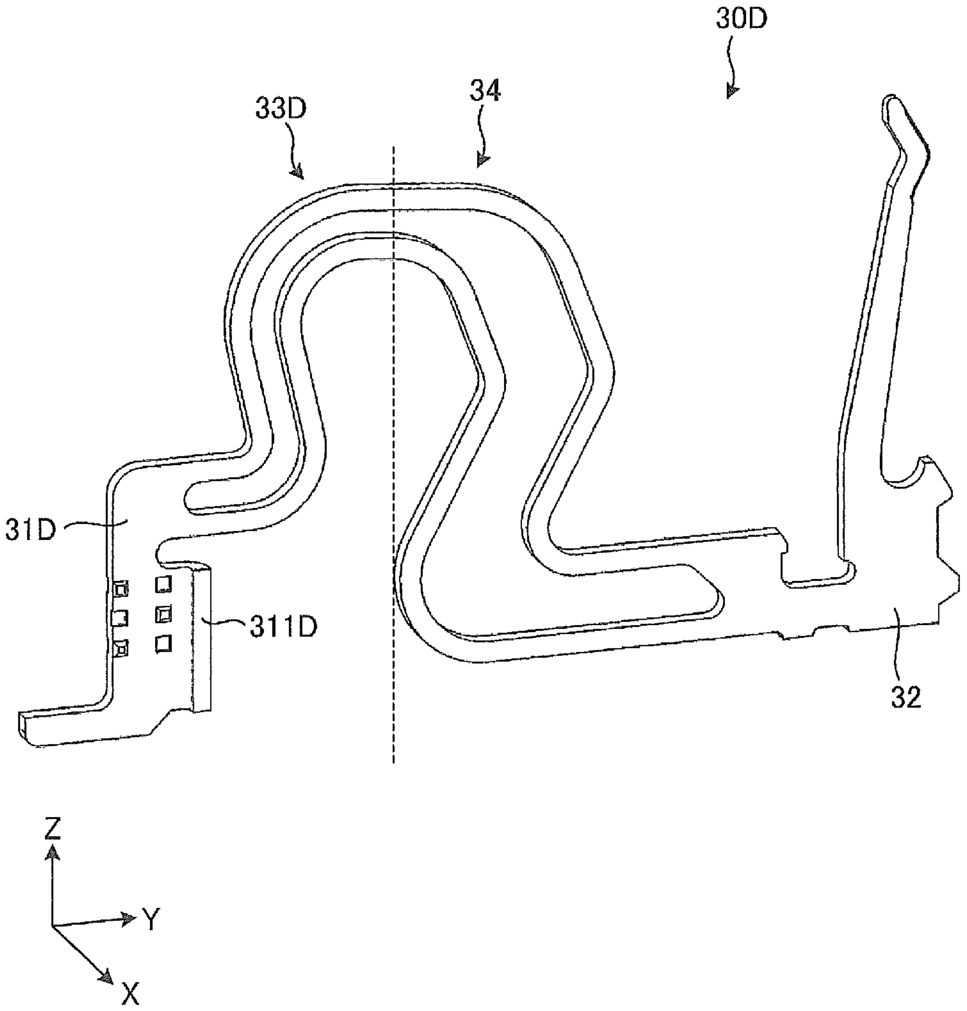
FIG. 20 is a perspective view of a contact of a fourth modified example.

FIG. 20 is a perspective view of a contact of a fourth modified example. As illustrated in FIG. 20, a contact 30D of the fourth modified example includes a first base portion 31D different from the first base portion 31 described above. Note that the same reference characters are attached to constituent elements that are the same as those described in the embodiment described above, and explanation thereof will not be repeated.

As illustrated in FIG. 20, the first base portion 31D includes a protruding portion 311D that fits in the first fixing groove 11 of the fixed insulator 10. The protruding portion 311D is pressed into the first fixing groove 11, The protruding portion 311D is formed by bending a part of the first base portion 31 in the arrangement direction (X direction) in which the plurality of contacts 30 are arranged.

Fifth Modified Example

Figure 21:
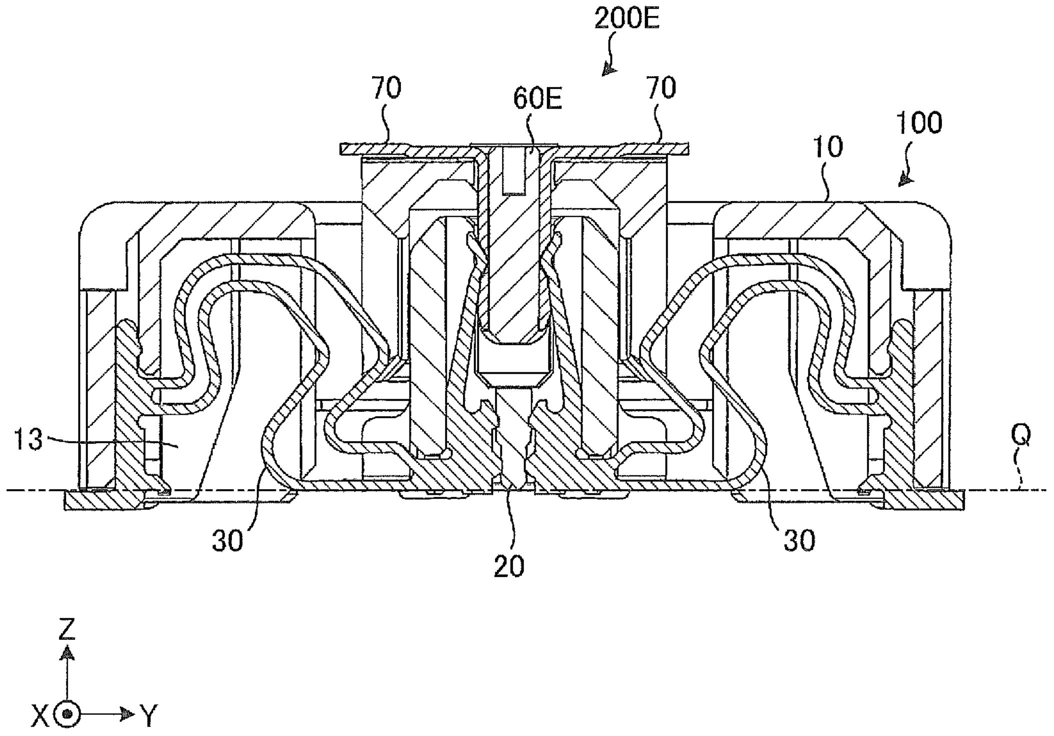
FIG. 21 is a cross-sectional view of the connector of the embodiment and another connector of a fifth modified example after the mating.

FIG. 21 is a cross-sectional view of the connector of the embodiment and another connector of a fifth modified example after the mating. Note that the same reference characters are attached to constituent elements that are the same as those described in the embodiment described above, and explanation thereof will not be repeated.

As illustrated in FIG. 21, another connector 200E of the fifth modified example includes an insulator 60E. The insulator 60E is a member formed of an insulating material. The insulator 60E is formed, for example, of synthetic resin. The insulator 60E does not include the sidewalls 61 described above. Because the space between the fixed insulator 10 and the movable insulator 20 is widened, contact between the contacts 30 and the sidewalls 61 during elastic deformation of the contacts 30 can be suppressed. Further, with the sidewalls 61 not provided, the connector of the embodiment can be downsized in the direction (Y direction) orthogonal to the arrangement direction. The partition wall 13 may extend to a virtual plane Q as illustrated in FIG. 21. The virtual plane Q is a plane that is parallel to the XY plane and passes through the bottom surface of the fixed insulator 10.

REFERENCE SIGNS LIST

10 Fixed insulator
11 First fixing groove
13 Partition wall
15 Top wall
17 First sidewall
18 Second sidewall
20 Movable insulator
21 Second fixing groove
30, 30A, 30B, 30C, 30D Contact
31, 31D First base portion
32 Second base portion
33, 33A, 33B, 33C, 33D First arm portion
34, 34B Second arm portion
35 Facing surface
38 Contact portion
40 Fixture
60, 60E Insulator
61 Sidewall
70 Contact
80 Fixture
100 Connector
131 Inclined surface
200, 200E Connector
300 Substrate
311, 311D Protruding portion
313 Recessed portion
330, 330A, 330C First slit
331 First linear portion
332 First bent portion
333 Second linear portion
334 Second bent portion
335 Connection portion
336 Intermediate portion
337 Protruding portion
339 Intermediate portion
340 Second slit
341 Connection portion
342 First linear portion
343 First bent portion
344 Second linear portion
345 Second bent portion
346 Third linear portion
347, 348 Protruding portion
400 Substrate
1000 Electronic device
3461 Inclined inner wall
C Centerline
P Virtual plane

The invention claimed is:

1. A connector comprising:
a fixed insulator;
a movable insulator that is disposed on an inner side of the fixed insulator and is movable relative to the fixed insulator; and
a plurality of contacts attached to the fixed insulator and the movable insulator, wherein
the fixed insulator comprises a plurality of first fixing grooves disposed along an arrangement direction in which the plurality of contacts are arranged, and partition walls each disposed between two corresponding adjacent ones of the contacts,
the movable insulator comprises a plurality of second fixing grooves disposed along the arrangement direction,
the contacts each comprise a first base portion supported by a corresponding one of the first fixing grooves, a second base portion supported by a corresponding one of the second fixing grooves, a first arm portion connected to the first base portion and disposed between two corresponding adjacent ones of the partition walls, and a second arm portion connected to the first arm portion and the second base portion, and
a largest width of the first arm portion is smaller than a largest width of the second arm portion.

2. The connector according to claim 1, wherein the second arm portion is disposed closer to the second base portion than the partition wall is.

3. The connector according to claim 1, wherein a thickness direction of the contacts is the arrangement direction.

4. The connector according to claim 1, wherein at least one of the first arm portion and the second arm portion comprises a linear portion that is linear and a bent portion that is bent.

5. The connector according to claim 1, wherein
the first arm portion comprises a first slit that is a slit formed through the first arm portion in the arrangement direction,
the second arm portion comprises a second slit that is a slit formed through the second arm portion in the arrangement direction, and
a largest width of the first slit is smaller than a largest width of the second slit.

6. The connector according to claim 5, wherein one of the first slit and one of the second slit are provided.

7. The connector according to claim 6, wherein a width of a portion of the first arm portion on each of both sides of the first slit is equal to a width of a portion of the second arm portion on each of both sides of the second slit.

8. The connector according to claim 6, wherein the second arm portion comprises a first bent portion that is convex toward the second base portion and a second bent portion that is convex toward the first base portion.

9. The connector according to claim 8, wherein a width of the second slit is largest at the second bent portion.

10. The connector according to claim 8, wherein the second arm portion comprises an inclined inner wall that is inclined to reduce a width of the second slit toward the second base portion, between the second base portion and the second bent portion.

11. The connector according to claim 1, wherein the partition walls each comprise an inclined surface inclining away from the second arm portion as the inclined surface gets closer to a virtual plane passing through bottom surfaces of a plurality of the first base portions.

12. An electronic device comprising the connector according to claim 1.

* * * * *